United States Patent
Grund et al.

(10) Patent No.: US 6,270,676 B1
(45) Date of Patent: Aug. 7, 2001

(54) PROCESS FOR REMOVING ETHERS AND/OR POLYCYCLIC AROMATIC HYDROCARBONS FROM WATER CONTAINING THEM

(75) Inventors: Gerda Grund, Duelmen; John Kahsnitz, Haltern, both of (DE)

(73) Assignee: Degussa-Huels Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 08/797,126

(22) Filed: Feb. 10, 1997

(30) Foreign Application Priority Data

Feb. 9, 1996 (DE) ............................... 196 04 685

(51) Int. Cl.$^7$ ....................................... C02F 1/28
(52) U.S. Cl. ......................... 210/669; 210/673; 210/692
(58) Field of Search ..................................... 210/669, 670, 210/673, 692, 693, 747

(56) References Cited

U.S. PATENT DOCUMENTS 3,531,463 * 9/1970 Gustafson ............................. 210/692
4,505,823 * 3/1985 Klein ................................. 210/502.1

* cited by examiner

*Primary Examiner*—Ivars Cintins
(74) *Attorney, Agent, or Firm*—Oblon, Spivak, McClelland, Maier & Neustadt, P.C.

(57) ABSTRACT

A process for the removal of ethers and/or PAH's from water, such as contaminated groundwater, is provided that proceeds by initially separating off solid constituents and then adsorbing ethers and polycyclic aromatic hydrocarbons to an adsorber resin, then, as needed, desorbing the adsorbed compounds with steam and regenerating the adsorber resin with an acid, to provide purification of highly polluted groundwater to such a substantial extent that the groundwater can be added to flowing surface waters without problem, and, if desired, used as cooling water or, after further biological purification, as drinking water.

12 Claims, 1 Drawing Sheet

PROCESS FOR REMOVING ETHERS AND/OR POLYCYCLIC AROMATIC HYDROCARBONS FROM WATER CONTAINING THEM

BACKGROUND OF THE INVENTION

1. Field of the Invention

The present invention relates to a process for removing ethers and polycyclic aromatic hydrocarbons from water containing them, such as groundwater.

2. Discussion of the Background

Little is known on groundwater treatment. Increasingly alarming news items continue to appear regarding the contamination of groundwater and drinking water sources with organic constituents, particularly with chlorinated solvents.

A number of methods are known, however, for cleaning up waste water or industrial process water. However, this involves the reduction of pollutant concentrations which are higher by orders of magnitude compared to groundwater and drinking water requirements. The aim of these processes is to discharge water in an environmentally compatible manner or re-use the water or an aqueous solution. There is no intention of providing drinking water by such treatments.

In "Neuere Verfahrenstechnologien in der Abwasserreinigung, Abwasser-und Gewässerhygiene" [Recent Processing Technologies in Waste Water Treatment, and Waste Water and Natural Water Sanitation], R. Oldenbourg Verlag, Munich, Vienna 1984, pages 235 to 251 describe several methods for treating chlorinated hydrocarbon-containing waste water from chlorination plants. According to one process, the waste water is first made alkaline (pH 11). The subsequent stripping, which is performed by countercurrent injection of steam, gives a distillate which, after condensing, divides into a chlorinated hydrocarbon phase and an aqueous phase. At the bottom of the stripper (oxistripper), waste water is produced which is subsequently biologically purified.

In special cases, waste water having a pH of 1 to 2 can also be subjected to stripping with steam in countercurrent. At the bottom of the stripper, a water having a high iron and hydrochloric acid content is produced, which is fed for further treatment to a chemical and mechanical sewage treatment plant.

Chlorinated-hydrocarbon-containing mining waste water is conventionally cleaned up in an adsorber resin plant. In this case the mining waste water, after it has been freed from solids as painstakingly as possible, is passed through an adsorber resin based on a divinylbenzene/styrene copolymer. The resin can later be reactivated by steam desorption. With this process, a considerable decrease in activity was found after one year of operation, due to irreversible iron deposits. Thus, a new plant requires operation at pH 1.5.

According to Technische Mitteilungen 77 (1984), 525–526, styrene copolymers or polyacrylates are suitable for removing aliphatic and aromatic hydrocarbons, chlorinated hydrocarbons, phenols, pesticides and surfactants from waste waters. The resins are then regenerated with steam. However, in the case of pesticides, the resins are regenerated using solvents, such as acetone or methanol, or with inorganic chemicals.

In DD 249 190, hydrochloric acid, which originates from chlorination processes and is contaminated with organic substances, is purified using hydrophilic, post-crosslinked divinylbenzene/styrene copolymers which preferably have an internal surface area of 1000 to 1600 $m^2/g$. The resin is regenerated with steam at 130° C. The bound organic substances can also be desorbed by solvents, such as alcohols and ketones.

By means of the cleanup processes cited, concentrations of <0.1 mg/l are achieved with respect to individual pollutant components. However, the total amount of organic constituents or chlorinated hydrocarbons after the cleanup is at best in the range of several mg/l (or several ppm), still considerably too high for the water to be added back into flowing surface water or for use in preparation of drinking water.

SUMMARY OF THE INVENTION

Accordingly, one object of the present invention is to provide a method to purify water polluted with ethers and/or polycyclic aromatic hydrocarbons in such a manner that it can be added to flowing surface waters without problem.

A further object of the present invention is to provide a method for purifying water to provide water suitable for further use as cooling water or steam generation.

A further object of the present invention is to provide a method for purifying polluted water to provide water that, after biological purification, is useful for drinking water production.

A further object of the present invention is to provide a method for purifying water polluted by ethers and/or polycyclic aromatic hydrocarbons to give a purified water containing below 10 $\mu g/l$ of ethers and below 5 $\mu g/l$ of polycyclic aromatic hydrocarbons.

These and other objects of the present invention have been satisfied by the discovery of a process for purifying water comprising carefully separating off solid contaminants, adsorbing any ethers and/or polycyclic aromatic hydrocarbons (PAH's) present to an adsorber resin by passing the water through the resin, and, as desired, regenerating the adsorber resin by desorbing the adsorbed compounds with steam and treating the adsorber resin with an acid.

BRIEF DESCRIPTION OF THE FIGURES

A more complete appreciation of the invention and many of the attendant advantages thereof will be readily obtained as the same becomes better understood by reference to the following detailed description when considered in connection with the accompanying FIGURE, wherein.

DETAILED DESCRIPTION OF THE PREFERRED EMBODIMENTS

Figure 1:
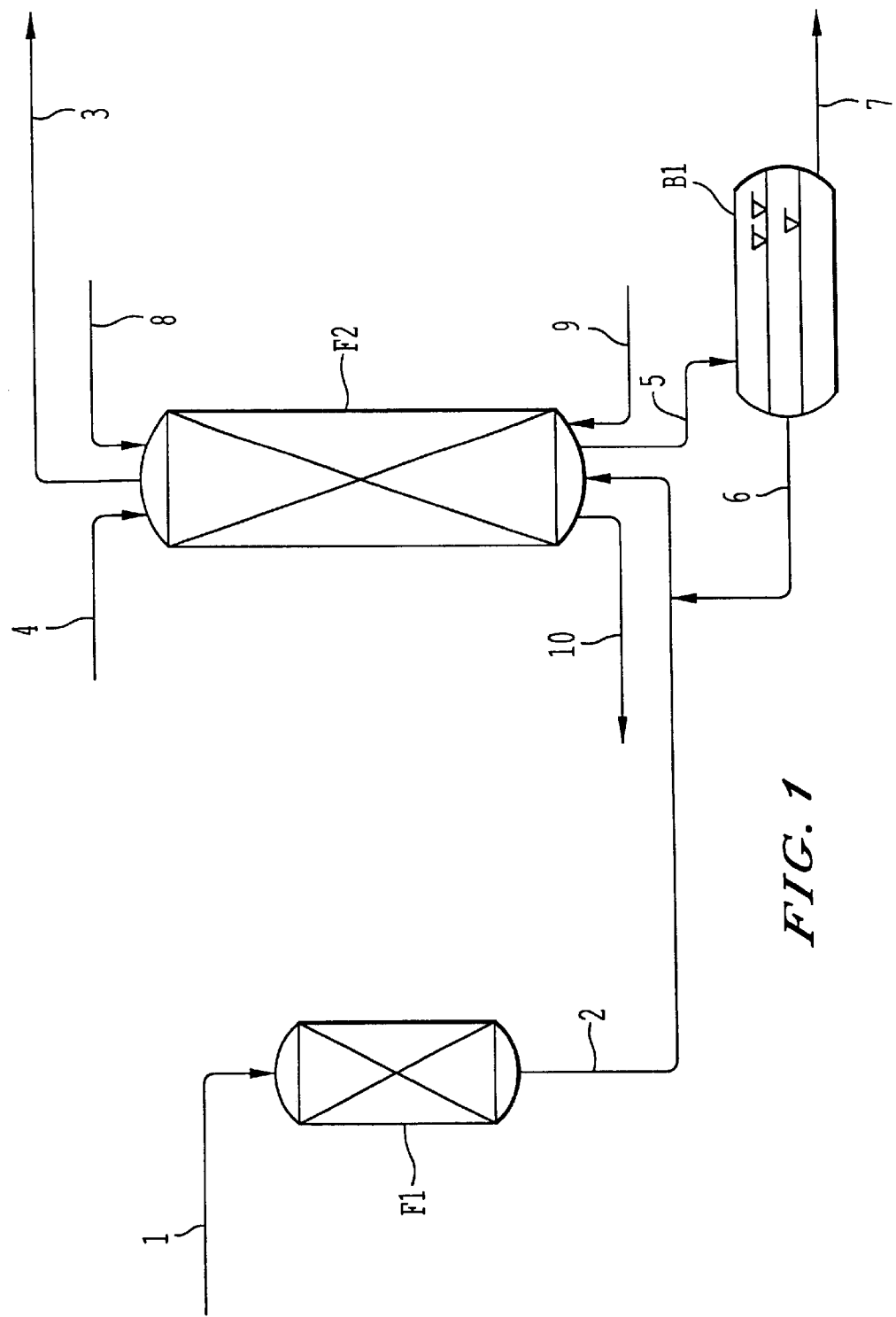
FIG. 1 provides a flow diagram of the process of the present invention.

The present invention relates to a process for removing ethers and/or polycyclic aromatic hydrocarbons (PAH's) from water, such as groundwater, comprising:

separating off any solid constituents from the water; and adsorbing the ethers, polycyclic aromatic hydrocarbons or both onto an adsorber resin capable of removing the ethers, polycyclic aromatic hydrocarbons or both from water to provide a purified water containing less than 10 $\mu g/l$ of ethers and less than 5 $\mu g/l$ of polycyclic aromatic hydrocarbons, followed by desorbing the ethers, polycyclic aromatic hydrocarbons or both from the adsorber resin with steam and regenerating the adsorber resin with an acid.

In describing the preferred embodiments of the present invention, polluted groundwater will be used as an exemplary contaminated water for use in the present process. However, it is noted that the present process can be used also in purifying other water sources that are contaminated by ethers and/or polycyclic aromatic hydrocarbons (PAH's).

The solid constituents, principally suspended matter, contained in the groundwater can be removed by conventional methods, such as centrifugation or filtration. Preferably they are removed by filtration. For the filtration step, suitable filters include sand filters, cloth filters and paper filters, with sand filters being preferred. The groundwater to be purified can be left at its original pH in the purification by adsorption. Preferably, the pH is from 1 to 10, with pHs of from 3 to 7.5 being most preferred.

A wide variety of ethers can be present in polluted groundwater. Examples include dibutyl ether, tetrahydrofuran, p-toluyl ether or halogenated aliphatic ethers, such as di(chloroisopropyl) ether or di(chloroethyl) ether.

Various PAH's can also be found in groundwater. Examples include naphthalene, acenaphthylene, acenaphthene, fluorene, phenanthrene, anthracene, fluoranthene, pyrene or chrysene.

Suitable adsorber resins for use in the present process include adsorbent resins having a specific surface area of from 600 to 1200 $m^2/g$, preferably from 700 to 900 $m^2/g$. Divinylbenzene/styrene copolymers adsorbent resins are preferred. However, any polymer which can adsorb organic compounds can also be used.

The adsorption of the ethers and PAH's onto the adsorbent resin should be performed at a temperature as low as economically possible, preferably at 5 to 50° C. and most preferably at 15 to 35° C. The desorption of the ethers and PAH's from the adsorbent resin with steam can be performed at suitable steam temperatures and is preferably carried out at 100 to 150° C. In order to minimize resin degradation, desorption temperatures of 110 to 140° C. are most preferred.

Since deposits occur on the resin when groundwater with unadjusted pH is purified by adsorption, inorganic deposits must be removed at regular intervals. Acids which can be used to regenerate the adsorber resin include mineral acids, such as hydrochloric acid, sulfuric acid and phosphoric acid. However, strong organic acids, such as formic acid and acetic acid, can also be used. Preferably, a 10 to 20% strength hydrochloric acid is used and the regeneration is carried out at 20 to 80° C. In the course of the regeneration process, an oxygen-containing gas, preferably air, is introduced in counter-current, Regeneration is not necessary after each adsorption/desorption cycle, but only when the adsorption capacity of the resin decreases. The resin is preferably regenerated after 30 to 80 cycles, with regeneration being needed less often with an acidic groundwater than with a neutral groundwater.

If the groundwater flows through the adsorber resin in a column, for example from bottom to top, the steam is preferably conducted in the opposite direction, that is from top to bottom, during the desorption phase. During the regeneration, the oxygen-containing gas is introduced below the resin layer.

By use of the present process, the contents of ethers and/or polycyclic aromatic hydrocarbons, that are normally originally present in groundwater at levels of about 3 mg/l, can be reduced to below 10 $\mu$g/l. The resulting purified groundwater can be added to flowing surface waters without problem. If the salt content is sufficiently low to meet local requirements, it can be used as cooling water and, after biological purification, can be used as drinking water.

While processes such as stripping or oxidation with $H_2O_2$ with UV irradiation cannot achieve the required purities, surprisingly, decreasing the content of the above organic constituents in groundwater succeeds by the present process. In view of the known results in the cleanup of industrial waste waters, it is surprising that the content of ethers and/or PAH's in groundwater can be decreased by the present process to values which are lower by 2 to 3 orders of magnitude.

High service lives of the resin are achieved with the present process, since unavoidable precipitations of inorganic deposits on the adsorber resin are repeatedly removed by regular flushing with aqueous acid.

Having generally described this invention, a further understanding can be obtained by reference to certain specific examples which are provided herein for purposes of illustration only and are not intended to be limiting unless otherwise specified.

EXAMPLES

Example 1

In accordance with FIG. 1, untreated groundwater having a pH of 7.1 was passed to the solids filter F1 via line 1. The groundwater freed from suspended matter which exited from the filter via line 2 and contained 1 mg/l of polycyclic aromatic hydrocarbons (PAH'S) and 50 mg/l of di(chloroisopropyl) ether, was passed into the adsorber F2 at 20° C. at a volumetric flow rate of 30 l/h. The adsorber had an inner diameter of 4 cm and a height of 150 cm and was packed with 1 kg of divinylbenzene/styrene copolymer having a specific surface area of 800 $m^2/g$ (PURASORBO AP 250 from Purolite, D-40882 Ratingen). A purified groundwater was obtained via line 3 containing <1 $\mu$g/l of PAH and <20 $\mu$g/l of di(chloroisopropyl) ether.

After a running time of 15 hours, the groundwater feed to F2 was interrupted and steam at 130° C. was passed to the adsorber via line 4 in an amount corresponding to 0.5% of the purified water. The eluate exiting via line 5 was separated in the phase separation vessel B1, the upper aqueous phase was recycled via line 6 and the lower organic phase was discharged via line 7.

After 35 adsorption-desorption cycles, the adsorption bed was regenerated by adding 20% strength hydrochloric acid via line 8 to the adsorber at 70° C. and simultaneously introducing air in countercurrent via line 9. The laden acid solution was removed via line 10.

This application is based on German Patent Application 199 04 685.8, filed with the German Patent Office on Feb. 9, 1996, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for removing ethers, polycyclic aromatic hydrocarbons or both from water, comprising:

a) adsorbing the ethers, polycyclic aromatic hydrocarbons or both onto an adsorber resin capable of removing the ethers, polycyclic aromatic hydrocarbons or both from water to provide a purified water containing less than 10 $\mu$g/l of ethers and less than 5 $\mu$g/l of polycyclic aromatic hydrocarbons;

b) desorbing the ethers, polycyclic aromatic hydrocarbons or both from the adsorber resin with steam; and c) regenerating the adsorber resin with an acid; and wherein the absorber resin is a divinyl benzene/styrene copolymer having a specific surface area of about 700 to 900 m$^2$/g; and wherein during the regenerating step, an oxygen containing gas is passed through the absorber resin in counter-current to the acid.

2. The process of claim 1, which further comprises, before step a), a step of separating off solid constituents, which step is performed at a pH of 1 to 10.

3. The process of claim 2, wherein the step of separating off the solid constituents is performed at a pH of 3 to 7.5.

4. The process of claim 2, wherein the regenerating step is performed after 30 to 80 cycles of the separating off, adsorbing and desorbing steps.

5. The process of claim 2, wherein the solid constituents are separated off by filtration or centrifugation.

6. The process of claim 1, wherein the desorbing step is performed at 100 to 150° C.

7. The process of claim 6, wherein the desorbing step is performed at 110 to 140° C.

8. The process of claim 1, wherein the regenerating step is performed with a solution of 10 to 20% strength aqueous hydrochloric acid at 20 to 80° C.

9. The process of claim 1, wherein the adsorbing step is performed at a temperature of from 15 to 35° C.

10. The process of claim 1, wherein the acid used in the regenerating step is selected from the group consisting of mineral acids and strong organic acids.

11. The process of claim 10, wherein the acid is selected from the group consisting of hydrochloric acid, sulfuric acid, phosphoric acid, formic acid and acetic acid.

12. The process of claim 1, wherein the water is ground water.

* * * * *